US006484126B1

(12) United States Patent
Brown, Sr. et al.

(10) Patent No.: US 6,484,126 B1
(45) Date of Patent: Nov. 19, 2002

(54) DIGITAL PLANT PROTECTION SYSTEM WITH ENGINEERED SAFETY FEATURES COMPONENT CONTROL SYSTEM

(75) Inventors: Edgar Mel Brown, Sr., West Suffield, CT (US); Frank Martin Kessler, Jr., Suffield, CT (US); Richard Michael Manazir, Jr., Barkhamsted, CT (US); Raymond Robert Senechal, East Hartford, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/398,422

(22) Filed: Sep. 17, 1999

Related U.S. Application Data

(63) Continuation-in-part of application No. 09/069,869, filed on Apr. 30, 1998, and a continuation-in-part of application No. 09/076,094, filed on Jun. 6, 1997.
(60) Provisional application No. 60/101,004, filed on Sep. 18, 1999.

(51) Int. Cl.[7] .................................................. G06F 11/30
(52) U.S. Cl. ........................................ 702/184; 376/215
(58) Field of Search ............................ 702/57, 58, 59, 702/60, 184; 340/825.36, 384.1; 376/215, 259, 216; 714/732

(56) References Cited

U.S. PATENT DOCUMENTS

| 3,888,772 A | 6/1975 | Neuner ........................ 376/215 |
| 3,892,954 A | 7/1975 | Neuner ........................ 714/736 |
| 4,054,486 A | 10/1977 | Lefebvre et al. ............. 376/215 |

(List continued on next page.)

FOREIGN PATENT DOCUMENTS

| EP | 0 145 188 A | 6/1985 |
| GB | 2 180 975 | 4/1987 |
| WO | WO 97/49020 | 12/1997 |

OTHER PUBLICATIONS

PCT International Preliminary Examination Report; Sep. 23, 1999; for Application No. PCT/US98/10895.
PCT Written Opinion; May 19, 1999 for Application No. PCT/US98/10895.
U.S. Patent Application Ser. No. 08/848,556, filed Apr. 28, 1998.
PCT International Preliminary Examination Report; Jan. 25, 2000, for Application No. PCT/US99/21364.
International Preliminary Examination Report.
Written Opinion from International Preliminary Examination Authority, dated Jun. 20, 2000.

*Primary Examiner*—Marc S. Hoff
*Assistant Examiner*—Mohamed Charioui

(57) ABSTRACT

A system and method for interfacing with a nuclear power plant's digital plant protection system activates emergency response devices when necessary. Two redundant bistable processors in each of four logic channels determine whether a particular parameter of the plant operation exceeds safety limits based on output from the plant protection system which monitors plant operations. Two independent coincidence processors in each channel compare the output of each bistable processor with the complementary output of a bistable processor of another logic channel. The results are provided to a series of component control system processors for activating emergency response devices when necessary. A fiber optic network interconnects the logic channels. Within each channel, a fiber optic network is provided between the component control system processors and a main control room so that a manual activation signal can be sent to the component control processors.

18 Claims, 1 Drawing Sheet

U.S. PATENT DOCUMENTS

| | | | |
|---|---|---|---|
| 4,427,620 A | 1/1984 | Cook | 376/215 |
| 4,434,132 A | 2/1984 | Cook | 376/259 |
| 4,562,035 A * | 12/1985 | Plaige | 376/215 |
| 4,588,547 A | 5/1986 | Impink, Jr. et al. | 376/254 |
| 4,661,310 A * | 4/1987 | Cook et al. | 376/259 |
| 4,687,623 A | 8/1987 | Cook | 376/259 |
| 4,692,299 A | 9/1987 | Crew et al. | 376/216 |
| 4,752,869 A | 6/1988 | Miller et al. | 700/82 |
| 4,804,515 A * | 2/1989 | Crew et al. | 376/216 |
| 5,267,277 A | 11/1993 | Scarola et al. | 376/216 |
| 5,287,390 A | 2/1994 | Scarola et al. | 376/216 |
| 5,832,049 A | 11/1998 | Metro et al. | |
| 5,859,884 A | 1/1999 | Metro et al. | 376/259 |
| 5,984,504 A * | 11/1999 | Doyle et al. | 700/108 |
| 6,049,578 A * | 4/2000 | Senechal et al. | 376/215 |
| 6,167,547 A * | 12/2000 | Senechal et al. | 714/732 |
| 6,292,523 B1 * | 9/2001 | Senechal et al. | 376/259 |

\* cited by examiner

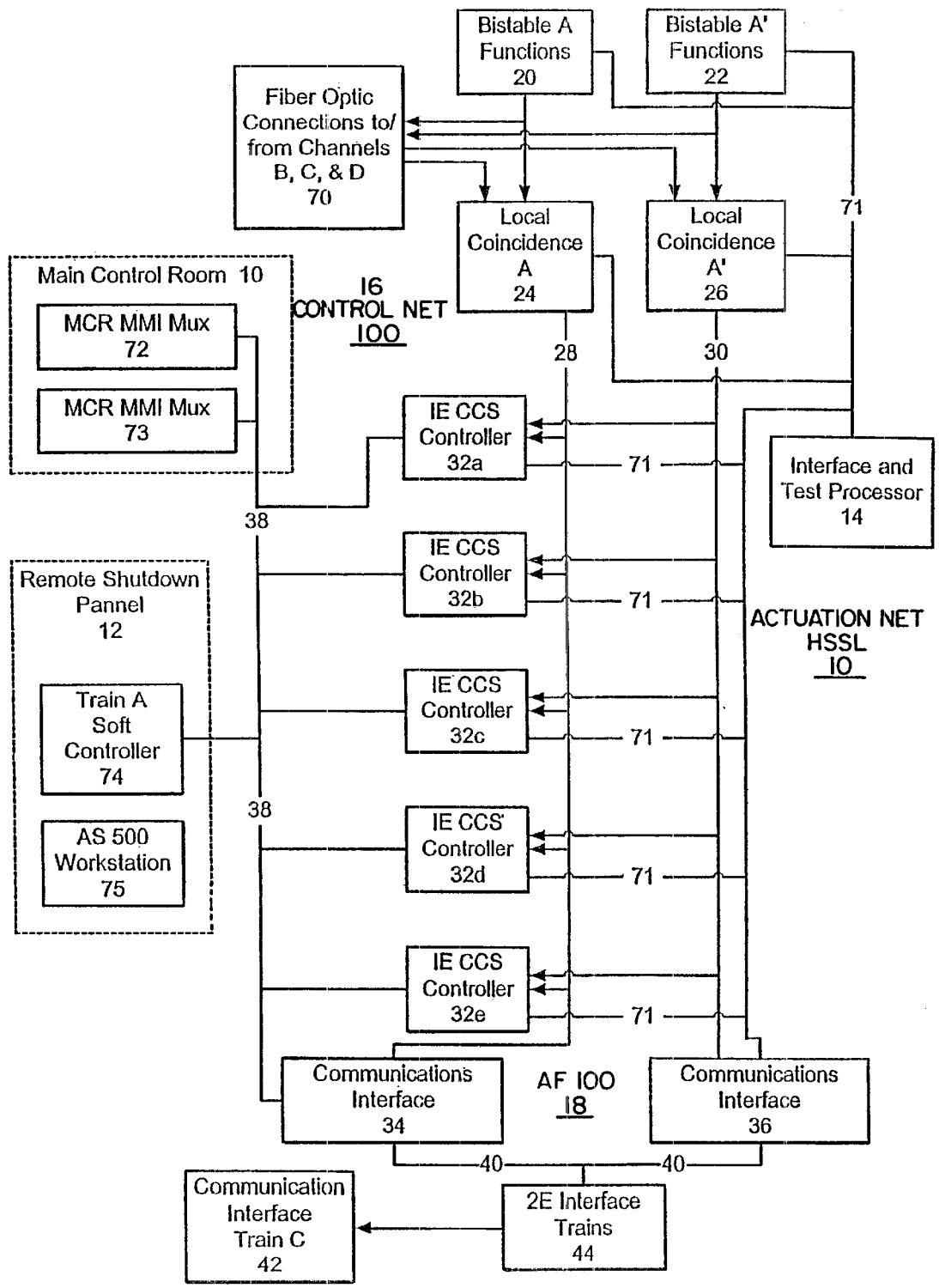

DIGITAL PLANT PROTECTION SYSTEM WITH ENGINEERED SAFETY FEATURES COMPONENT CONTROL SYSTEM

CROSS REFERENCES TO RELATED APPLICATIONS

This application is related to and claims priority on the basis of U.S. Provisional Application No. 60/101,004, filed on Sep. 18, 1999.

This application is a continuation in part of, and also related to subject matter disclosed in copending U.S. patent applications Ser. Nos. 09/069,869, filed on Apr. 30, 1998, (Attorney Docket No. ABB-164, C970270) and 09/076,094, filed on Jun. 6, 1997, (Attorney Docket No. ABB-165, C970330).

FIELD OF THE INVENTION

The present invention relates to the field of nuclear power plants. More specifically, the present invention relates to an improved monitoring system for monitoring nuclear power plant operation and effecting emergency safety procedures in the event plant operations exceed established parameters. Still more specifically, this invention relates to an improved Engineered Safety Features (ESF) Component Control System (CCS) for a Digital Plant Protection System (DPPS).

BACKGROUND OF THE INVENTION

For safety, nuclear power plants include complex monitoring or "plant protection" systems. These systems monitor the operation of the nuclear reactor and the power plant in general. If any portion of the reactor or other important functions of the plant that is being monitored exceed established safe parameters, the plant protection system can effect emergency procedures, such as shutting down the reactor, to prevent complications from arising.

Additionally, plant protection systems are designed to be redundant and self-validating so that any malfunctions that arise will be identified before they result in serious problems. For example, for a particular monitoring function of the plant protection system, two or more redundant systems may be provided. The redundant systems monitor the same parameter or perform the same calculations. The outputs of the redundant systems are then compared to verify the proper functioning of all the systems. Disagreement between redundant systems signals a potential problem.

Many of the existing nuclear power plants have been in operation for some time and employ plant protection systems that are aging or obsolete in comparison with modern technology. For example, most existing plant protection systems for nuclear power plants are Solid State Protection Systems ("SSPS") which employ an extensive network of discrete digital electronics, mechanical switches and electromechanical relays. These relays and switches having moving parts which are actuated using electromagnetism to effect the necessary connections between the various parts of the plant protection system.

In an SSPS system, two redundant logic channels may be provided to monitor a single parameter of the nuclear power plant's operation. If one channel fails, the other channel maintains the necessary monitoring function.

Given the service age of many of the components of such solid state systems, increasing failure rates are expected as the components begin to exhibit the normal problems associated with the end phase of the product life cycle. For example, industry reliability models predict an increasing failure rate for electromechanical relays of the type and vintage in question due to stuck and pitted contacts or open coils. These failures will obviously threaten the reliability of the plant protection system and the safety of the nuclear power plant being protected.

Additionally, the coincidence logic in an SSPS for checking the coincidence between redundant monitoring systems is performed by custom circuit cards that are generally obsolete. For example, these cards typically employ Motorola High Threshold Logic (MHTL) circuits. Industry reports indicate that MHTL circuits are susceptible to aging failures that can result in intermittent logic levels. Thus, increasing age and the complexity of the existing logic circuitry can result in decreased system reliability, increased trouble shooting difficulty and decreased plant availability due to the unnecessary activation of emergency shut down and other emergency response mechanisms.

Consequently, there is a need in the art for an improved plant protection system. More particularly, there is a need in the art for an improved plant protection system that makes use of current technology to provide high reliability throughout an extended life cycle.

The two cited copending parent applications to this application respectively disclose an all-digital logic Digital Plant Protection System (DPPS) and a Digital Engineering Safety Features Actuation System (DESFAS) which act as an interface between a Plant Protection System (DPP) and Engineered Safety Features (ESF) in a nuclear power plant. Such nuclear plant safety systems have multiple channels, each channel having bistable functions, with local coincidence testing systems. Such channels exist to interconnect a main control room, a remote shutdown panel, an interface and test processor (an ITP net) through a control network, such as an AF 100 Net. It nevertheless is desired in such a system to increase the speed of actuation through an HSSL Actuation Link, or Actuation Net HSSL diverse from the AF 100 Net which overrides upon actuation.

SUMMARY OF THE INVENTION

It is an object of the present invention to meet the above-described needs and others. Specifically, it is an object of the present invention to provide an improved emergency response system operating on the data provided by the plant protection system. More particularly, it is an object of the present invention to provide an improved emergency response system that makes use of current technology to provide high reliability throughout an extended life cycle. Still more particularly, it is an overall object of this invention to increase speed of actuation through an HSSL Actuation Link diverse from an Actuation network which ovrides upon actuation.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an engineered safety features component control system which receives signals from a digital plant protection system that is monitoring parameters of the plant operation. The system includes two or more, preferably four, logic channels monitoring a particular parameter of the plant operation. Each of the logic channels includes a bistable processor for receiving input from the digital plant protection system relating to the particular parameter which the logic channel is to monitor and for determining if that particular parameter of the plant operation is within predetermined safe limits.

A coincidence processor is associated with each bistable processor for comparing an output of the bistable processor with outputs from bistable processors in the others logic channels. One or more component control system processors receive the output of each coincidence processor and actuate the components of the emergency response systems based on that output.

In a preferred embodiment, there are four logic channels all monitoring the same parameter of plant operation. Additionally, a series of component control system processors are used, each controlling a predetermined group of emergency response devices. Preferably, at least one of the component control system processors is redundant.

Each logic channel preferably includes a second, redundant bistable processor that receives input and performs functions identical to those of the other bistable processor in the channel. A second coincidence processor is provided in connection with the second bistable processor. The second coincidence processor receives output from the second bistable processor and compares that output with output from other corresponding redundant bistable processors in the other logic channels. The output from the second coincidence processor is also provided to the component control system processors or controllers which actuate the components of the emergency response systems based on the output of both of the coincidence processors.

The system of the present invention also preferably includes an inter-channel fiber optic network for communicating output from the bistable processors of the various logic channels to the coincidence processors of the other logic channels. A second fiber optic network is used to connect each of the component control system processors to the main control room of the power plant that is protected by the plant protection system. Fiber optic communications are preferred for their resistance to electromagnetic interference (EMI) and other forms of interference.

The system of the present invention also preferably includes a test and interface processor that is connected via a test network to the bistable processors, the coincidence processors and the component control system processors. The test and interface processor is capable of testing the system or delivering signals to the component control system processor or processors for actuating the components of the emergency response systems, through an Actuation Net HSSL 10 to control the Control Net AF 100.

The system of the present invention may also include a remote shutdown panel connected to the fiber optic network between the main control room and the component control system processors. The remote shutdown panel that is so connected can be used for delivering signals to the component control system processors to actuate the components of the emergency response systems if the main control room becomes uninhabitable.

The present invention also encompasses a method of implementing an engineered safety features component control system which receives signals from a digital plant protection system that is monitoring parameters of plant operation. The method preferably includes the steps of providing two or more redundant logic channels monitoring a particular parameter of the plant operation, performing redundant processing within each of the logic channels on input from the digital plant protection system relating to that particular parameter, and, based on the processing, making two independent determinations of whether that particular parameter of the plant operation is within predetermined safe limits.

BRIEF DESCRIPTION OF THE DRAWINGS

The accompanying drawing illustrates the present invention and is a part of the specification. Together with the following description, the drawing demonstrates and explains the principles of the present invention.

The FIGURE is a block diagram of an Engineered Safety Features Component Control System ("ESF-CCS") of a Digital Plant Protection System ("DPPS") according to the present invention.

DETAILED DESCRIPTION OF THE PREFERRED EMBODIMENTS

Using the drawing, the preferred embodiments of the present invention will now be explained. The FIGURE illustrates a single logic channel which, in combination with at least one other identical redundant channel, monitors a particular parameter of the operation of a nuclear power plant and effects an emergency response in the event the monitored parameter varies beyond established safe limits.

In the preferred embodiment of the present invention, the FIGURE illustrates an Actuation Net HSSL 16 having a first channel, i.e. channel A, of a four channel set. The four channels, A, B, C, and D are all identical and monitor the same parameter. For simplicity, only channel A is illustrated in the FIGURE. Some signals and functions may use fewer channels.

Logic channel A as illustrated in the FIGURE begins with a bistable processor (20) that receives input from the sensors of the digital plant protection system (DPPS) (not shown) to monitor a particular parameter of the operation of the nuclear power plant. An example of a parameter being monitored is the temperature of the reactor. In such a case, the bistable processor (20) performs change-in-temperature calculations. The bistable processor (20) then outputs a signal that indicates that the monitored parameter is, or is not, within the acceptable safe limits.

The other logic channels B, C & D monitor the same parameter, preferably at different locations within the power plant. The output of the bistable processor (20) is provided over a fiber optic network (70) to the other three logic channels B, C & D. The results of the monitoring on channels B, C & D are also provided over the fiber optic network (70) to logic channel A.

Fiber optic networks, such as those shown (70) and (38—described below), are preferred in the application of a nuclear power plant protection system due to their immunity to environmental factors such as electromagnetic interference (EMI). Fiber optic networks are also resistant to other forms of interference, cross-talk, signal leakage, and the like.

The output of the bistable processor (20) is also provided to a local coincidence logic processor (24). Preferably, the connection between the bistable processor (20) and the coincidence processor (24) includes redundant HSSL data links.

The coincidence processor (24) will check to see if the determination of the bistable processor (20) that the monitored parameter is or is not within the established safe range agrees with the determination made by the bistable processors of the other logic channels B, C & D. The results of the coincidence check are output on line (28).

As illustrated in the FIGURE, line (28) connects the coincidence logic processor (24) to a series of component control system ("CCS") controllers or processors (32a to 32e), together acting as a part of a Control Net AF 100, shown at reference numeral 16. These controllers (32), based on the output of the coincidence processor (24), actuate emergency response systems when appropriate. For example, the CCS controllers (32a to 32e) each operate switchgear and motor control centers to control pumps, fans, dampers, valves, solenoids and motor operated valves that constitute the emergency response systems of the power plant. These components actuated by the CCS controllers (32a to 32e) are preferably separated into groups and allocated to different cabinets for increased robustness to a single failure.

In general, the CCS controllers (32a to 32e) each control sixteen components of the emergency response systems and provide analog input associated with related systems. Some of the CCS controllers (32a to 32e) are preferably redundant with redundant outputs controlling a single interposing relay. This enhances the reliability of the system.

An external reset of emergency response systems may also be made by interfacing with the coincidence processor (24) through interface processor (14). A reset signal is then sent over line (28) to the CCS controllers (32).

The output of the coincidence processor (24) on line (28) is also provided to a communications interface (34) which is, in turn, connected via a fiber optic network (38) to the main control room (10) of the power plant. An indication of the results of the monitoring on channel A can therefore be displayed or indicated to plant operators in the main control room.

In addition to the redundancy provided by the four logic channels A to D, each channel is internally redundant under the principles of the present embodiment. Specifically, a second bistable processor (22), identical to the first bistable processor (20), is provided to duplicate the work of the first bistable processor (20). The output of the redundant bistable processor (22) is provided to a second logic coincidence processor (26) as well as being transmitted over the HSSL fiber optic network (70) to the other three logic channels B, C & D.

The redundant coincidence processor (26) also receives, via fiber optic network (70), an output signal from corresponding redundant bistable processors in each of the other logic channels B, C & D. The coincidence processor (26) then compares the output of the bistable processor (22) to the incoming signals from channels B, C & D. The results of this comparison are output to the series of CCS controllers (32a to 32e).

The CCS controllers (32a to 32e) will then activate the necessary emergency response equipment. As a precaution, the controllers (32) may only activate an emergency response when both of the local coincidence processors (24 and 26) are indicating a dangerous condition detected by both bistable processors (20 and 22) and confirmed by the counterpart bistable processors in the other three logic channels B, C & D.

Line (30) also connects the output of the redundant coincidence processor (26) to a communications interface (36) which is connected by line (40) to the communications interface (34) and, ultimately, the main control room (10). By way of example, the communications interfaces (34 and 36) may be AC 160 units. The line (40) also includes a fiber optic connection to the 2E interface trains (44) which, in turn, connects to the communication interface of train C (42).

The series of CCS controllers (32a to 32e) are also connected through the fiber optic network (38) to the main control room (10) and a remote shut down panel (12). This connection is provided so that the emergency response functions controlled by the CCs controllers (32a to 32e) can be manually activated from the control room (10) or from the remote shutdown panel (12) in the event that the main control room (10) is uninhabitable.

Alternatively, the fiber optic cable network (71) of the test processor (14) can be interfaced to provide another system for actuating emergency response measures through the CCS controllers (32a to 32e). Finally, each CCS controller (32a to 32e) may have a manual means (not shown) located with the processor itself for initiated the emergency response measures.

The main control room (10), as shown in the FIGURE, may include a pair of MCR MMI multiplexers (72 and 73) for handling the various signals provided to and from the main control room by the logic channels A to D. The remote shut down panel (12) includes a train A soft controller (74) and a workstation, preferably an AS 500 workstation (75).

Finally, a test bus (71) is provided to connect various components of the logic channel to an interface and test processor (14). For example, both of the bistable processors (20 and 22), the coincidence processors (24 and 26) and the CCS controllers (32a to 32e) are connected over the bus (71) to the test processor (14). The test processor (14) is also connected via the bus (71) to the communications interface (36). In this way, the test processor can be used to test the various components of the logic channel to which it is connected.

A maintenance and test panel (not shown) that is provided in an ESF-CCS cabinet with the interface and test processor (14) may provide the same control and status display capability as the flat panel display of the main control room (10). The maintenance and test panel can also provide test results and allow manual testing of the system.

The present invention provides the following benefits and advantages. First, the response time between the time when sense input is provided to the bistable processor and the signaling of the CCS processors for initiation of trip circuits for emergency response is less than or equal to 300 milliseconds. The use of signal multiplexing and data communication networking minimizes cost and promotes simplicity during a phased installation. The separation of control and monitoring functions avoids data communication bottlenecks, maintains simple control system designs and reduces the potential for operator error.

The availability of the system is enhanced through improved design. Automatic testing functions are available. The system is flexible for expansion and upgrading to meet new requirements. Fewer spare parts and less training are required as compared to conventional plant protection systems.

There are also many redundant systems within the system of the present invention. There are four independent channels for each parameter from the process sensor through and including the initiation circuits for tripping emergency response devices. Within each channel, communications are redundant and diverse. Automatic and manual actuation are accomplished through different signal paths for diversity.

Each ESF-CCS train controls one ESF system train and there are four redundant ESF-CCS trains used to operate four (or less) totally redundant ESF trains. Where redundancy exists at the plant system level, component assignments to redundant ESF-CCS trains are made to maintain that level of design redundancy.

Functional diversity is also achieved by segmenting the components into separate groups controlled by separated CSs controllers (32), each having inputs in circuit with both of the local coincidence processors anad the interface and test processor. Segmentation is used to minimize the impact of a component failure on system operation. Segmentation removes multiple control monitoring functions from a single large processor and distributes them over many smaller processors, which limits the impact of a processor failure.

There is also diversity of actuation. The primary trip path is the actuation data link (28). Manual backup trip from the main control room (10) is via the communications network (38). The back-up manual trip path is the test network (71).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of implementing an engineered safety features component control system which receives signals from a digital plant protection system monitoring parameters of plant operation, the method comprising:

providing a plurality of logic channels monitoring a particular parameter of said plant operation, performing redundant processing within each of said logic channels on input from said digital plant protection system relating to said particular parameter, based on said processing, making two independent determinations within each of said logic channels of whether said particular parameter of said plant operation is within predetermined safe limits; and controlling plant operation and shutdown with a plurality of controllers in accordance with said two independent determinations and an output of an interface and test processor.

2. The method of claim 1, further comprising separately comparing both of said determinations with similar determinations from others of said plurality of logic channels.

3. The method of claim 2, further comprising actuating components of emergency response systems based on said comparisons.

4. The method of claim 3, wherein said actuating components of said emergency response systems further comprising providing a plurality of component control system processor each controlling a predetermined group of emergency response devices.

5. The method of claim 4, further comprising at least one redundant component control system processor.

6. The method of claim 1, further comprising actuating components of emergency response devices based on said determinations.

7. The method of claim 6, further comprising providing a redundant system for actuating said components of said emergency response devices independently of said determinations of whether said particular parameter is within said safe limits.

8. The method of claim 1, wherein said redundant processing is performed with first and second bistable processors and said making two independent determinations is performed with first and second coincidence processors.

9. The method of claim 1, further comprising interconnecting said plurality of logic channels with a fiber optic network for communicating said determinations of whether said particular parameter of said plant operation is within predetermined safe limits between said logic channels.

10. An engineered safety features component control system which receives signals from a digital plant protection system monitoring parameters of plant operation comprises:

a plurality of logic channels monitoring a particular parameter of said plant operation, wherein each of said logic channels comprises:

a first bistable processor for receiving input from said digital plant protection system relating to said particular parameter and determining if said particular parameter of said plant operation is within predetermined safe limits;

a first coincidence processor for comparing an output of said first bistable processor with outputs from bistable processors in other channels of said plurality of logic channels;

a second, redundant bistable processor which receives input and performs functions identical to those of the first bistable processor;

a second coincidence processor which receives output from said second bistable processor and compares that output with output from redundant bistable processors in other channels of said plurality of logic channels;

at least one component control system processor receiving output from said first coincidence processor and output from said second coincidence processor for said channel and from at least one additional channel and actuating components of emergency response systems based upon the output of both of said coincidence processors; and an interface and test processor connected to said bistable processors, said coincidence processors, and said at least one component control system processor.

11. The system of claim 10, wherein said at least one component control system processor comprises a plurality of component control system processors each controlling a predetermined group of emergency response devices.

12. The system of claim 11, wherein at least one of said component control system processors is redundant.

13. The system of claim 10, further comprising a test and interface processor which is connected via a test network to said bistable processors, said coincidence processors and said at least one component control system processor.

14. The system of claim 13, wherein said test and interface processor is capable of testing said system or delivering signals to said at least one component control system processor for actuating said components of said emergency response systems.

15. The system of claim 10, further comprising a fiber optic network connecting each of said at least one component control system processors to a main control room of a power plant protected by said plant protection system.

16. The system of claim 15, further comprising a remote shutdown panel connected to said fiber optic network for delivering signals to said at least one component control system processor to actuate said components of said emergency response systems.

17. The system of claim 10, wherein said plurality of logic channels comprises four logic channels.

18. The system of claim 10, further comprising an interchannel fiber optic network for communicating output from said bistable processors among said coincidence processors of said plurality of channels.

* * * * *